(12) United States Patent
Hoeing et al.

(10) Patent No.: US 10,384,632 B2
(45) Date of Patent: Aug. 20, 2019

(54) COMPOSITE MATERIAL FOR AN AIRBAG COVER

(71) Applicant: K.L. KASCHIER- UND LAMINIER GMBH, Bad Bentheim-Gildehaus (DE)

(72) Inventors: Maik Hoeing, Gescher (DE); Albert Roring, Gronau-Epe (DE); Rembert Schulze Wehninck, Munich (DE)

(73) Assignee: K.L. KASCHIER-UND LAMINIER GMBH, Bad Bentheim-Gildehaus (DE)

( * ) Notice: Subject to any disclaimer, the term of this patent is extended or adjusted under 35 U.S.C. 154(b) by 54 days.

(21) Appl. No.: 15/546,010

(22) PCT Filed: Dec. 23, 2015

(86) PCT No.: PCT/EP2015/002611
§ 371 (c)(1),
(2) Date: Jul. 25, 2017

(87) PCT Pub. No.: WO2016/119810
PCT Pub. Date: Aug. 4, 2016

(65) Prior Publication Data
US 2018/0001858 A1    Jan. 4, 2018

(30) Foreign Application Priority Data

Jan. 30, 2015    (DE) .................... 10 2015 001 103

(51) Int. Cl.
*B32B 3/04* (2006.01)
*B32B 3/10* (2006.01)
(Continued)

(52) U.S. Cl.
CPC .............. *B60R 21/215* (2013.01); *B32B 3/04* (2013.01); *B32B 3/10* (2013.01); *B32B 3/30* (2013.01);
(Continued)

(58) Field of Classification Search
CPC ........ B60R 2021/21537; B60R 21/215; B32B 5/02; B32B 5/024; B32B 5/26;
(Continued)

(56) References Cited

U.S. PATENT DOCUMENTS 5,639,115 A * 6/1997 Kelley ................ B60R 21/2165
280/728.3
6,093,272 A * 7/2000 Visconti ............ B29C 45/14508
156/212

(Continued)

FOREIGN PATENT DOCUMENTS

CN         101421134 A      4/2009
CN         103619657 A      3/2014
(Continued)

*Primary Examiner* — Laura Freedman
(74) *Attorney, Agent, or Firm* — Norman B. Thot

(57) ABSTRACT

A composite material provided in the form of a sheet material includes at least one textile layer as a cover for an airbag. The cover is arranged to form at least one flap with a hinge which includes a hinge region. One side or both sides of the at least one textile layer includes a plastics coating. A melting point of the plastics coating is lower than a melting point of the at least one textile layer. The hinge region is arranged to form at least one single or double fold along the hinge so that the sheet material contacts itself once or twice. In a region of the at least one single or double fold, areas of the plastics coating are arranged to contact each other and, via a prior introduction of heat or a subsequent introduction of heat, are melted onto each other.

10 Claims, 1 Drawing Sheet

(51) Int. Cl.
- *B32B 3/30* (2006.01)
- *B32B 5/02* (2006.01)
- *B32B 5/26* (2006.01)
- *B32B 7/02* (2019.01)
- *B32B 7/04* (2019.01)
- *D06N 3/00* (2006.01)
- *D06N 3/04* (2006.01)
- *D06N 3/12* (2006.01)
- *B32B 27/08* (2006.01)
- *B32B 27/12* (2006.01)
- *B32B 27/32* (2006.01)
- *B32B 27/36* (2006.01)
- *B60R 21/215* (2011.01)

(52) U.S. Cl.
CPC ............... *B32B 5/02* (2013.01); *B32B 5/024* (2013.01); *B32B 5/26* (2013.01); *B32B 7/02* (2013.01); *B32B 7/04* (2013.01); *B32B 27/08* (2013.01); *B32B 27/12* (2013.01); *B32B 27/32* (2013.01); *B32B 27/36* (2013.01); *B32B 2255/02* (2013.01); *B32B 2255/26* (2013.01); *B32B 2262/0253* (2013.01); *B32B 2262/0276* (2013.01); *B32B 2307/732* (2013.01); *B32B 2571/00* (2013.01); *B32B 2605/00* (2013.01); *B32B 2605/003* (2013.01); *B32B 2605/08* (2013.01); *B60R 2021/21537* (2013.01); *D06N 3/0011* (2013.01); *D06N 3/045* (2013.01); *D06N 3/123* (2013.01)

(58) Field of Classification Search
CPC .... B32B 3/04; B32B 3/10; B32B 3/30; B32B 27/08; B32B 27/12; B32B 27/32; B32B 27/36; B32B 7/02; B32B 7/04; B32B 2605/00; B32B 2605/003; B32B 2605/08; B32B 2571/00; B32B 2307/732; B32B 2262/0253; B32B 2262/0276; B32B 2255/02; B32B 2255/26; D06N 3/0011; D06N 3/045; D06N 3/123
See application file for complete search history.

(56) References Cited

U.S. PATENT DOCUMENTS

| | | | |
|---|---|---|---|
| 7,160,404 B2* | 1/2007 | Cowelchuk | B60R 21/216 156/308.2 |
| 7,165,781 B2* | 1/2007 | Cesar | B29C 44/1209 280/728.3 |
| 7,178,825 B2* | 2/2007 | Fujii | B60R 21/2155 280/728.3 |
| 7,992,890 B2* | 8/2011 | Nogaret | B60R 21/215 280/728.2 |
| 8,096,577 B2* | 1/2012 | Roring | B60R 21/215 16/221 |
| 8,157,289 B2* | 4/2012 | Bittner | B60R 21/2165 280/728.3 |
| 8,998,247 B2* | 4/2015 | Hoeing | B60R 21/215 280/728.1 |
| 9,090,222 B2* | 7/2015 | Roring | B60R 21/215 |
| 9,139,152 B2* | 9/2015 | Nogaret | B60R 21/215 |
| 2006/0017268 A1* | 1/2006 | Bondoerffer | B60R 21/2165 280/732 |
| 2009/0102164 A1 | 4/2009 | Eckert et al. | |
| 2010/0117339 A1 | 5/2010 | Roring | |
| 2014/0037502 A1 | 2/2014 | Hiroo et al. | |
| 2014/0110923 A1 | 4/2014 | Maita et al. | |
| 2014/0117649 A1 | 5/2014 | Hoeing et al. | |
| 2016/0023625 A1* | 1/2016 | Roring | B60R 21/215 280/728.3 |

FOREIGN PATENT DOCUMENTS

| | | |
|---|---|---|
| DE | 10 2004 010 643 A1 | 10/2005 |
| DE | 10 2005 037 939 A1 | 2/2007 |
| DE | 20 2007 016 718 U1 | 4/2008 |
| DE | 10 2009 048 686 A1 | 4/2011 |
| DE | 10 2012 021 315 A1 | 4/2014 |
| EP | 2 057 044 B1 | 5/2009 |
| EP | 2 113 428 A2 | 11/2009 |
| EP | 2 727 775 A1 | 5/2014 |
| FR | 2 902 727 A1 | 12/2007 |
| WO | WO 2012/051738 A1 | 4/2012 |

* cited by examiner

1. Heating

2. Introduction of the loop

3. Compression of the loop for adhesive bonding and sealing

COMPOSITE MATERIAL FOR AN AIRBAG COVER

CROSS REFERENCE TO PRIOR APPLICATIONS

This application is a U.S. National Phase application under 35 U.S.C. § 371 of International Application No. PCT/EP2015/002611, filed on Dec. 23, 2015 and which claims benefit to German Patent Application No. 10 2015 001 103.0, filed on Jan. 30, 2015. The International Application was published in German on Aug. 4, 2016 as WO 2016/119810 A1 under PCT Article 21(2).

FIELD

The present invention relates to a composite material in the form of a sheet material with at least one textile layer for covering an airbag, wherein the covering forms at least one flap with a hinge.

BACKGROUND

Airbag covers made of plastic which form one or two flaps which each have preferential fracture lines at three edges which break apart after triggering the airbag and which form a hinge around which the flap swivels at the fourth edge, but which does not break apart at the fourth edge to provide that the flap is not propelled into the interior of the motor vehicle, have previously been described. This secure retention of the flap in the region of the hinge is achieved via additional non-breaking threads in the hinge region, as is described in EP 2 057 044.

DE 10 2012 021 315 A1 describes that the hinge of an airbag cover flap can have a fold or loop which unfolds during the opening of the hinge and thus makes additional movement available to the flap. This technology is mainly utilized when textiles such as woven fabrics (for example, aramids or polyesters) are used. The intention is here that upon opening of the airbag, the layer thickness within the dashboard, resulting from supportive material, spacer medium (for example, foam or knitted spacer fabric, or the like) and from the decorative material, is bridged so that the flap opens sufficiently widely to permit a complete and unhindered deployment of the airbag without the flap breaking away. The loop is generally introduced during the actual injection process by using splits which form the loop after insertion of the shaped material into the injection mold.

This processing step is complicated and risky. An alternative is therefore introducing the loop in an upstream process with a plurality of individual steps. It is here necessary to fix the loop via an additional retention system, for example, an adhesive or some other attachment form. This approach has also previously been described. This process is, however, time-consuming and expensive because a plurality of operating steps exist.

SUMMARY

An aspect of the present invention to provide a composite material for covering an airbag which has a lower production cost and where the fold situated in the region of the flap hinge is protected from the entry melt into the fold or loop during the injection-molding process.

In an embodiment, the present invention provides a composite material in the form of a sheet material which includes at least one textile layer as a cover for an airbag. The cover is arranged to form at least one flap comprising a hinge which comprises a hinge region. One side or both sides of the at least one textile layer comprises/comprise a plastics coating. A melting point of the plastics coating is lower than a melting point of the at least one textile layer. The hinge region is arranged to form at least one single or double fold along the hinge so that the sheet material contacts itself once or twice. In a region of the at least one single or double fold, areas of the plastics coating are arranged to contact each other and, via a prior introduction of heat or a subsequent introduction of heat, are melted onto each other.

BRIEF DESCRIPTION OF THE DRAWINGS

The present invention is described in greater detail below on the basis of embodiments and of the drawings in which.

DETAILED DESCRIPTION

Figure 1:
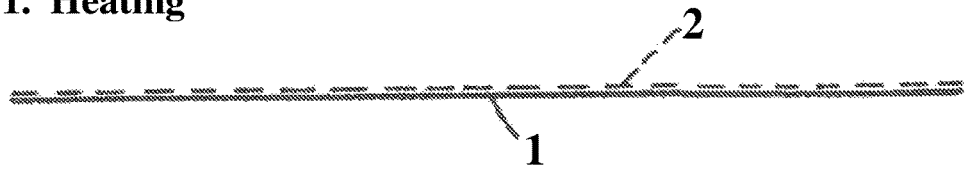
FIG. 1 shows the heated composite material with a coating, in particular a film, applied on one side prior to introduction of the fold/loop.
Figure 2:
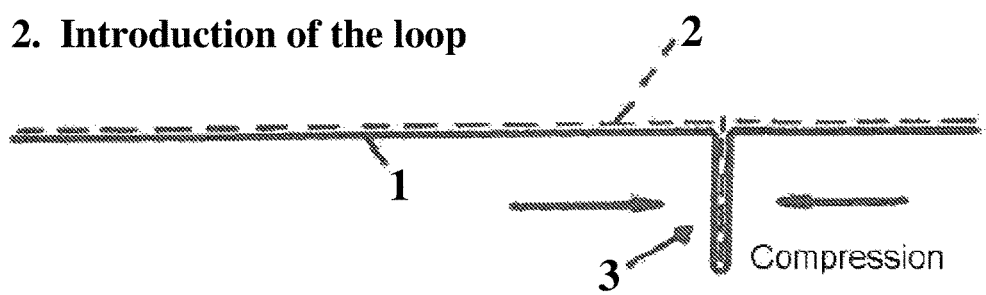
FIG. 2 shows the heated composite material with a fold/loop introduced.
Figure 3:
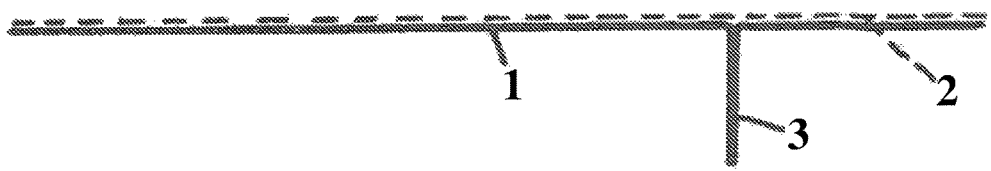
FIG. 3 shows the heated composite material after compression/pressing of the fold/loop.

In an embodiment, the present invention provides that:
one side or both sides of the textile layer has/have a plastics coating, in particular a film, the melting point thereof being lower than that of the textile layer;
the composite material in the hinge region along the hinge forms at least one single or double fold, where there is/are one or two instance(s) where the sheet material has one or both sides in contact with each other; and
in the region of the fold the areas of the coating, in particular the coated areas, for example, the film areas, contact each other and, by virtue of prior or subsequent introduction of heat, have been melted onto each other.

The present invention provides for the adhesive bonding of the fold/loop to itself via a coating, in particular a film (made of thermoplastic material), which has been attached on the surface and which is incipiently melted by the introduction of heat and which, by virtue of lateral pressure onto the loop, undergoes adhesive bonding to itself and thus retains the fold/loop in position without any additional operating steps. All of the operating steps required take place during the production of the fold/loop.

This process is particularly suitable when thermoplastic composite materials are used as the airbag hinge (examples being self-reinforced composite materials based on polypropylene) which must be heated for the "folding" shaping process, and adhesive bonding within the fold/loop results from compression thereof. The fold/loop is here, together with the surface material situated thereon, which is situated on the entire surface of the material, adhesively bonded to itself in the region of the fold/loop so as to fix the position of the fold/loop and the depth of the fold/depth of the loop.

No molten casting composition can thereby pass into the loop during the overmolding process. The function of the loop is thus optimized. A high and uncontrollable risk would exist of particles escaping and that the functioning of the loop would be defective if the molten composition were to pass into the loop during the injection-molding process. A sealing of the operational equipment is also no longer required.

The drawings show diagrammatic sections of an embodiment of the present invention which is described in greater detail, inclusive of alternatives, below.

The airbag cover is formed from a rigid and/or stiff plastics material in the form of a sheet or web. It is therefore a relatively thin, flat sheet with the same thickness throughout and with limited elasticity (in contrast to a film).

The airbag cover is here composed of a thermoplastic material which is in particular made of thermoplastic polypropylene (PP). The material can, for example, be a self-reinforced composite material 1 (compound/composite) in the form of a sheet where homogeneous polypropylene films, copolymeric polyolefin films, homogeneous polyester films, or copolymeric polyester films alternate with further reinforcement layers which are composed of, or comprise, polypropylene strips or polyester strips. The strips here form a thin layer within which the strips are either present in an ordered manner, in particular having been placed or woven in the manner of a woven fabric, or which are present in unordered manner with random orientation. The term "woven fabric layer" is used below for all cases. The film layers and the strip layers (reinforcement layers) alternate, the total number of the strip layers being at least two layers, in particular, from three to eight layers, with a total thickness of from 0.4 mm to 2 mm, in particular from 0.8 to 1 mm. All of the layers fuse when pressure and heat are introduced to give a single sheet material, for example, a sheet composed only of polypropylene layers or of polyester layers.

In an embodiment of the present invention, the further reinforcement layers situated between or on the film layers can, for example, comprise fibers or threads instead of strips, the fibers or threads being composed of polypropylene films or of polyester films which have an ordered arrangement (including that of woven fabric) or an unordered arrangement.

The upper side and/or the lower side of the sheet of composite material 1 has a coating 2 which can in particular be laminated with a thermoplastic film, in particular with a thermoplastic film made of polyester, of polypropylene, or of copolymeric polyolefin.

One or two flaps, which cover the airbag, are subsequently introduced into the sheet of composite material 1 so that fracture lines are arranged, for example, at three edges of each flap within the sheet of composite material 1 which continue through the entire sheet of composite material 1 and which release the flap after the airbag is triggered. An elongate hinge region is arranged at the fourth edge around which, after the triggering procedure, the flap swivels but does not break away.

Prevention of break-away is achieved in that at least one fold/loop 3, or a groove, is molded into the sheet of composite material 1 in the region of the hinge which runs along the longitudinal extent of the hinge or along the flap edge within the hinge to provide an additional length of material perpendicularly to the longitudinal extent of the hinge. This additional length of material in the region of the hinge provides that a sufficient path length is available when the flap swivels around the hinge, and thus provides that the flap does not break away.

In an embodiment of the present invention, the at least one fold/loop 3 can, for example, be produced by using a heated lance (hot lance) which is pressed into the composite material in the region of the hinge so as to deform the thermoplastic material. The material can, for example, additionally be heated to some extent or over its entire surface prior to the deformation.

One or both sides of the sheet of composite material 1, in particular the textile layer, in particular in the form of a woven fabric layer, is coated with a plastics coating 2, in particular with a film, which adheres securely on the surface of the sheet of composite material 1, in particular to the textile layer. The thickness of the plastics coating 2, in particular of the film, can, for example, be 0.02 to 0.1 mm, for example, from 0.03 to 0.06 mm.

The melting point of the plastics coating 2 here is lower than, or the same as, that of the sheet of composite material 1 or of the textile layer(s). The plastic of the plastics coating 2, or a portion of the plastics coating 2, can, for example, melt at below 160° C., for example, at from 125 to 155° C., while the plastic of the woven fabric melts above 160° C., for example, at or above 165° C.

In an embodiment of the present invention, a single fold 3 (V-fold) or a double fold (N-fold) can, for example, be introduced into the sheet of composite material 1 along the hinge in the hinge region. In the case of the single fold, care must be taken that the coating 2 is present within the fold 3 so that the internal areas within the fold 3, with their coating 2, are in contact with each another. In contrast thereto, if a double folding is selected, both external areas of the sheet of composite material 1 have a coating/film 2.

Prior to introduction of the fold 3, the material is heated to from 125 to 155° C., and thus to a temperature at which the material can be deformed and the internally situated surfaces can bond adhesively to one another so that the coating melts, but the composite material/the remaining sheet material 1 does not melt. The fold areas therefore fuse to one another which upon cooling produce a fold 3 which comprises no free intervening space. No injection-molding composition can pass into the fold 3 during a subsequent injection molding.

The particular selection of the coating material or of the film material also provides that after the airbag has been triggered and when breakage and swiveling of the airbag flap occur, the fold/loop 3 reliably parts to provide additional movement to the flap.

Polypropylene, copolymeric polyolefin, or polyester can, for example, be used for the coating material 2, in particular for the film material.

The present invention is not limited to embodiments described herein; reference should be had to the appended claims.

What is claimed is:

1. A composite material provided in the form of a sheet material comprising at least one textile layer as a cover for an airbag, the cover being arranged to form at least one flap comprising a hinge which comprises a hinge region,
   wherein,
   one side or both sides of the at least one textile layer comprises/comprise a plastics coating, a melting point of the plastics coating being lower than a melting point of the at least one textile layer,
   the hinge region is arranged to form at least one single or double fold along the hinge so that the sheet material contacts itself once or twice, and
   in a region of the at least one single or double fold, areas of the plastics coating are arranged to contact each other and, via a prior introduction of heat or a subsequent introduction of heat, to be melted onto each other.

2. The composite material as recited in claim 1, wherein the plastics coating is a film.

3. The composite material as recited in claim 1, wherein,
a thickness of the composite material is from 0.4 to 2 mm, and
a thickness of the plastics coating is from 0.02 to 0.1 mm.

4. The composite material as recited in claim 1, wherein the at least one single or double fold has a V-shape or an N-shape.

5. An airbag cover comprising the composite material as recited in claim 1, wherein,
the at least one single or double fold comprises at least one of narrow elongate folded areas and folded layers which run along the hinge, and
the at least one of narrow elongate folded areas and folded layers are arranged to be in close contact with each other so that no intervening space exists between the at least one of narrow elongate folded areas and the folded layers.

6. The airbag cover as recited in claim 5, wherein the at least one of narrow elongate folded areas and the folded layers are arranged to be parallel to each other.

7. The airbag cover as recited in claim 5, wherein,
the composite material is provided as a self-reinforced thermoplastic comprising a plurality of layers comprising a polypropylene or a polyester which are arranged to be mutually superposed, and
the plurality of layers are arranged so that a layer of homogeneous polypropylene film, of copolymer-containing polyolefin film, of homogeneous polyester film, or of copolymer-containing polyester film alternates with a reinforcement layer where either the polypropylene or the polyester takes the form of at least one of strips, fibers and threads, or where the reinforcement layer comprises at least one of polypropylene/polyester strips, polypropylene/polyester fibers and polypropylene/polyester threads.

8. The airbag cover as recited in claim 7, wherein the at least one of strips, fibers and threads made of the polypropylene or of the polyester in the reinforcement layer is arranged to form a woven fabric.

9. The airbag cover as recited in claim 7, wherein the arrangement of the strips and/or fibers in the reinforcement layer is unordered so has to have a random orientation.

10. The airbag cover as recited in claim 5, wherein the plastics coating comprises polypropylene, copolymeric polyolefin, or polyester.

* * * * *